United States Patent [19]

Thompson

[11] 4,368,827
[45] Jan. 18, 1983

[54] CONTAINER WITH INTEGRAL HANDLE AND METHOD OF FORMING SAME

[76] Inventor: Mortimer S. Thompson, P.O. Box 454, Arlington, Mass. 02174

[21] Appl. No.: 246,045

[22] Filed: Mar. 20, 1981

Related U.S. Application Data

[63] Continuation-in-part of Ser. No. 40,864, May 21, 1979, Pat. No. 4,257,525, and a continuation-in-part of Ser. No. 28,886, Apr. 10, 1979, Pat. No. 4,280,859, which is a continuation of Ser. No. 877,603, Feb. 14, 1978, abandoned.

[51] Int. Cl.³ .............................................. B65D 23/10
[52] U.S. Cl. .............................. 215/100 A; 220/94 A
[58] Field of Search ......................... 215/100 A, 1 C; 220/94 A

[56] References Cited

U.S. PATENT DOCUMENTS

| 398,234 | 2/1889 | Cleary | 220/94 A |
| 3,250,434 | 5/1966 | Howlett | 220/94 A X |
| 3,708,082 | 1/1973 | Platte | 220/94 A X |

FOREIGN PATENT DOCUMENTS

| 1137095 | 1/1957 | France | 220/94 A |
| 364936 | 1/1932 | United Kingdom | 220/94 A |
| 979873 | 1/1965 | United Kingdom | 220/94 A |

Primary Examiner—Donald F. Norton
Attorney, Agent, or Firm—Morgan, Finnegan, Pine, Foley & Lee

[57] ABSTRACT

A new and unique container and a method of forming the same. The container includes a wall with a recess which provides space for finger placement and integral means, such as opposing and spaced apart projections, extending from the container wall into the recess for lifting, carrying and pouring from the container.

20 Claims, 11 Drawing Figures

U.S. Patent  Jan. 18, 1983  Sheet 1 of 3  4,368,827
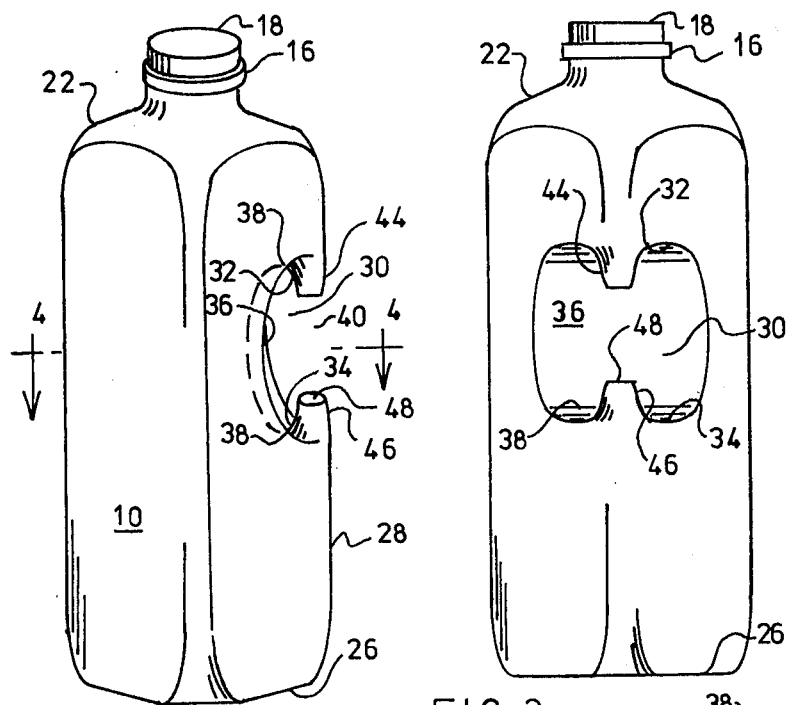
FIG. 1
FIG. 2
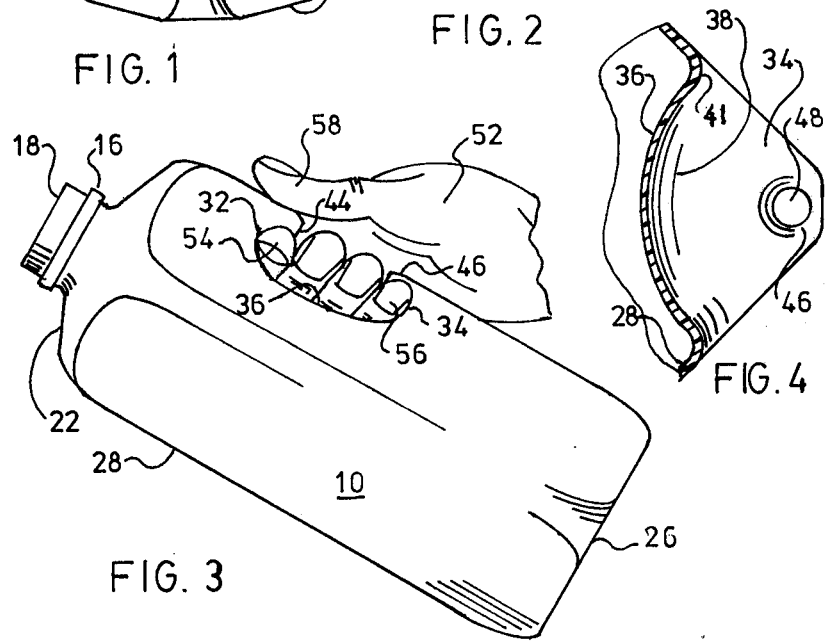
FIG. 3
FIG. 4

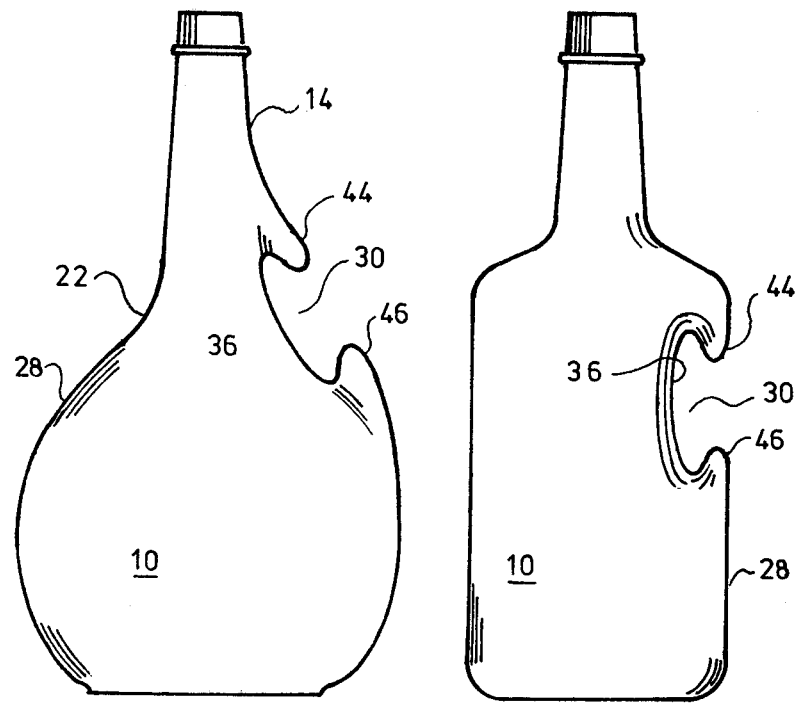
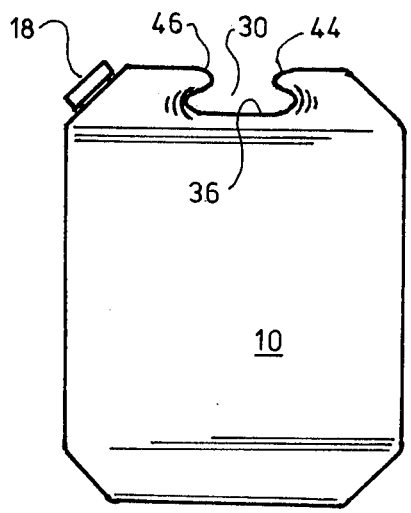
FIG. 9  FIG. 10
FIG. 11

4,368,827

CONTAINER WITH INTEGRAL HANDLE AND METHOD OF FORMING SAME

This application is a continuation-in-part application of my application, Ser. No. 040,864, filed May 21, 1979, now U.S. Pat. No. 4,257,525 and Ser. No. 028,886, filed Apr. 10, 1979, now U.S. Pat. No. 4,280,859 which, in turn, is a continuation application, Ser. No. 877,603, filed Feb. 14, 1978, now abandoned.

This invention relates to a container having an integral handle and to a method of forming the same, and more particularly to a container which includes a recess in a top or side wall thereof and a handle having opposing, spaced apart integral projections extending into the recess for gripping, lifting, carrying and pouring from the container.

BACKGROUND OF THE INVENTION

While larger glass and plastic bottles (e.g., 32 ounce and larger) with handles are widely used they have drawbacks in manufacture and in use.

With respect to large plastic bottles with handles for lifting, carrying and pouring, they generally are made by the extrusion blow molding process.

In this process an extruder initially forms large diameter preforms, hollow tubes known as parisons, and the parisons are positioned within blow molds having the desired final shape of the bottles. In each blow mold a portion of the parison is pinched off to form a handle shape and the pinched parison is blown to its final bottle dimensions with a hollow handle and an interconnecting web. Thereafter, the web is removed to provide a handle for gripping, lifting, carrying and pouring.

In forming such hollow handles relatively high plastic temperatures and substantial parison thicknesses are required to provide satisfactory fusion in the pinched and blown parison. Also, the parison must have a large enough diameter so that it will essentially traverse the breadth of the bottle when pinched and blown.

The procedures for forming these bottles are well known. See *Modern Plastics Encyclopedia*, Vol. 54, No. 10A, 1977-1978, McGraw-Hill Publishing Co. (e.g., section on "Blow Molding" at page 230, et seq.; also see section on "Injection Blow Molding" at page 232 et seq.).

Depending on the design, the pinched, blown hollow handle can provide ease in carrying, lifting and pouring, or simply ease in carrying and lifting. In the instance of a pouring handle, moreover, the need to grip the side walls of the container is eliminated. This can result in lighter weight bottles at lower costs. These and other features make the pouring handle very popular for large plastic bottles made from a wide variety of thermoplastic materials including polyolefins (polyethylene and polypropylene) and polyvinyl chloride.

However, these methods and the resulting bottles with hollow handles do have shortcomings. For example, decreasing the amount of plastic, used to form the bottles, known as "light weighting", is limited in many cases by the need for adequate parison thickness to provide the requisite fusion along the extensive pinched off areas.

Another limitation is that the required large diameter parison produces bottles having wide variations in wall thicknesses, especially at and near the sidewall at the bottom juncture and at the shoulder area—the most vulnerable areas to drop impact and denting forces. This results because the pinch off distributes the parison into thick areas at each end of the pinch off and in very thin areas in the blown bottle at right angles to it.

Still another limitation is that the relatively high fusion temperatures required to form the pinched off hollow handles cannot be used to form handles in the newer stretch blow molding process for forming plastic bottles. This process differs from the hollow handle blow molding process in that the parison is first stretched and then blown while at temperatures which are much lower than the fusion temperatures, generally within the 100° F. range above $T_g$ (the temperature at which the plastic material passes from the glass phase to the rubber phase). This procedure, which is known as stretch blow molding, or orientation blow molding, is not only replacing earlier blow molding techniques, but is opening up new markets. Advantages of the new procedures are related to the biaxial orientation of the polymeric material. While the parison is at a temperature insufficient to permit free plastic flow it is expanded biaxially to conform with the blow mold. The temperature of operation generally within the 100° F. range immediately above $T_g$ is such that expansion introduces true strain into the material, and this strain is translated into a definable polymer orientation which results in a number of attributes.

Alignment of polymer molecules results in increased tensile strength, as well as increased clarity, increased impact strength, and reduced creep. A vast market for carbonated soft drink containers is a direct result of significantly improved gas barrier properties.

Suitable container materials for stretch blow molding are substituted and unsubstituted thermoplastic hydrocarbons. Commonly used materials at this time include acrylonitrile polymers, polyvinyl chloride, polyethylene terephthalate, and polypropylene. This newer procedure also is known. See *Modern Plastics Encyclopedia*, Vol. 54, No. 10A, 1977-1978, McGraw-Hill Publishing Co. (e.g., section on "Stretch-Blow Molding" at page 233 et seq.).

Of the above commonly used materials for stretch-blow molding, polyethylene terephthalate possesses an additional beneficial processing characteristic in that, while it is being stretched at biorientation temperatures, the non-crystalline polymer crystallizes. This greatly increases its resistance to further stretching. The result is a much more uniform wall thickness, even in bottle shapes which otherwise are noted for poor wall thickness distribution.

The problem with producing plastic containers with handles using the stretch blow processes results from the nature of the process and condition of the plastic at the time it is biaxially oriented. First, it is not possible to produce handles by the aforementioned parison pinch-off technique because the plastic temperature required for suitable molecular orientation is much too low to permit adequate fusion of the plastic. To initially form the handle at elevated temperatures and then to cool to biorientation temperatures before stretching and blowing would yield handles, and substantial other unoriented portions of the container, with inferior containment and other properties. Further, the large diameter parison required for the parison pinch-off technique reduces the amount of desired biorientation.

With respect to producing both plastic and glass bottles with handles, moreover, difficulty has been encountered in locating the handle in other than the uppermost portion of the bottle. To achieve optimum balance when pouring, however, it is more desirable from a handling standpoint to, in most instances, place the handle in a more central position on the sidewall of the bottle. At present only extrusion blow molding processes with their already discussed shortcomings may be used to form such bottles and handles. Glass and other plastic blow molding processes require that the handle be located on the uppermost region of the bottle because the handle must be formed in the mold for the preform or parison before expansion in the blow mold.

Thus, there is a need for new and improved bottles with handles and for new and improved methods for forming such bottles.

SUMMARY OF THE INVENTION

In accordance with the present invention, there is provided a new and unique container with an integral handle. The container includes pouring means, a wall extending from such means, and a recess in the wall which provides space within the container for finger placement. The handle includes opposing, integral, spaced apart means extending into the recess for gripping, lifting, carrying and pouring from the container.

The container can be formed from plastic or glass and can have a wide variety of configurations. Depending on the configuration and location of the pouring means or container opening, the recess for the integral handle, illustratively, can be in a side wall or a top wall of the container. In a plastic or glass bottle having a neck and a base the recess can be in the interconnecting side wall. In a rectangularly shaped plastic container with the pouring means at an end portion of the container top wall, the recess can be located in said top wall.

The integral handle means preferably includes opposing projections extending from the container wall into and essentially within the recess at the open end thereof. The integral opposing projections are of a shape and length to permit suitable purchase of two fingers. In a bottle where the recess is in the side wall the upper projection can be held by the forefinger for gripping and carrying and for cooperating with the lower projection which is held by the little finger for pouring. In this embodiment the space in the recess between the projections is sufficient to accommodate the two middle fingers. Thus, the projections need be only a fraction of the width of the fore and little fingers. Illustratively, the recess can be about 3.5 inches in length, about 1.5 inches in depth and the projections can be about from 0.625 to 0.75 inches.

In a rectangularly shaped container with the pouring means at an end portion of the top wall, the described recess and integral handle can be located in said top wall.

The container of the invention also can include means for temporarily deflecting the container wall adjacent the recess to accommodate different hand sizes and to provide a snug fit to maximize grip security. The deflecting means can include a pleat or bellows in a plastic container adjacent the recess.

In this invention, moreover, the recess preferably is provided in the container wall at a location which optimizes pouring and handling balance while achieving the desired container style.

Another feature of this invention is that the described containers and integral handles can be formed on existing machinery and equipment without the hereinbefore described attendant disadvantages.

The glass containers of the present invention can be produced by blow molding, and the plastic containers can be produced by injection or extrusion blow molding or by extrusion or injection stretch blow molding.

Other and additional embodiments of the containers of the invention and methods of forming such containers will become apparent from the following illustrative embodiments and from the accompanying claims.

DESCRIPTION OF (ILLUSTRATIVE EMBODIMENTS OF) THE INVENTION

The following is a detailed description together with accompanying drawings of the invention. It is to be understood that the invention is capable of modification and variation apparent to those skilled in the art within the spirit and scope of the invention.

In the drawings is:

FIG. 1 is a side elevational view of a dairy bottle of the present invention;

FIG. 2 is a rear elevational view of the bottle of FIG. 1;

FIG. 3 is a side elevational view of the bottle of FIG. 1 being held during pouring;

FIG. 4 is a sectional view of FIG. 1 taken along the lines 4—4 (showing the shape of the recess backwall);

FIG. 9 is a side elevational view of a wine bottle of the present invention;

FIG. 10 is a side elevational view of a liquor bottle of the present invention;

FIG. 11 is a side elevational view of a jerry can of the present invention.

Figure 5:
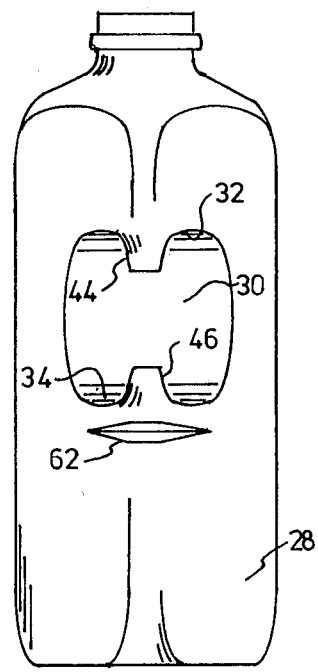
FIG. 5 is a rear elevational view of another dairy bottle of the present invention (showing means for expanding the recess)

Referring to FIGS. 1 to 4, there is shown a dairy bottle 10 of the present invention, having a generally square cross section.

The bottle 10 can be formed from glass or plastic by blow molding, and includes a closure cap 18 and a neck ring 16. In this embodiment a shoulder 22 extends below the ring 16 and interconnects the neck ring 16 to the sidewall 28 of the bottle 10.

In the sidewall 28 of the bottle 10 between the neck ring 16 and the base 26 is a recess 30. The recess 30 has a longitudinal axis which is parallel to the longitudinal axis of the bottle 10, and is large enough for comfortable finger placement during gripping, lifting, carrying and pouring. The recess 30 includes a top wall 32 and a bottom wall 34 which are substantially horizontal and a substantially vertical back wall 36. The walls 32 and 34 are connected to the wall 36 by curvilinear portions 38. At the outer ends of the walls 32 and 34 the recess 30 has an open end 40.

As shown in this embodiment the recess 30 is concave in the vertical and horizontal planes for greater bottle capacity and for columnar stresses imposed by stacking loads. In other words the back wall 36 has a concave shape along its length (the normally vertical or longitudinal direction of the bottle 10) and a concave shape in cross section (the normally horizontal direction of the bottle 10). To spread loading stresses along its cross section, the ends 41 of the concave cross sectional shape are rounded to form reverse curvilinear segments which tangentially extend into the sidewall 28.

The integral gripping, lifting, carrying and pouring handle has opposing projections 44 and 46 which extend from walls 32 and 34 into and within the open recess end 40. Each projection 44 and 46 is generally circular in cross section and includes a top 48 which in this embodiment is generally flat.

To lift and carry the bottle 10 the forefinger 54 of hand 52 is placed against the top wall 32 and between back wall 36 and upper projection 44. As the bottle 10 is raised its weight is transmitted to forefinger 54 by the upper wall 32 and projection 44 providing a secure hooking engagement. The length of projection 44 need be only a fraction of the width of finger 54 to provide sufficient purchase for secure lifting and carrying. Further security is contributed by a pinching engagement at or above projection 44 between thumb 58 and forefinger 54.

To pour from bottle 10 the little finger 56 of hand 52 is placed against the lower projection 46 which is then lifted at the same time that thumb 58 is pressed downwardly at or above projection 44 resulting in a tilting action to the bottle 10. The length of projection 46 need only be a fraction of the width of little finger 56 to provide sufficient purchase for pouring.

The fingers between forefinger 54 and little finger 56 need not be used. However when all fingers are aligned as shown in FIG. 3 the middle fingers serve as spacers to hold the forefinger 54 against upper wall 32 and the little finger 56 against lower wall 34 increasing the securing of the grip on projections 44 and 46 when large heavy bottles are involved.

The size of the recess 30 is sufficient to accommodate normal hand sizes. Typically the recess 30 can be about 3.5 inches in length and about 1.5 inches in depth and the projections 44 and 46 are tapered or flanged into the walls of the recess and can have an average diameter of about 0.50 to 0.75 inches and a length of about 0.625 to 0.75 inches.

Referring to other embodiments of the invention which now will be described, like reference numbers refer to like parts of the bottle that have been described.

Figure 6:
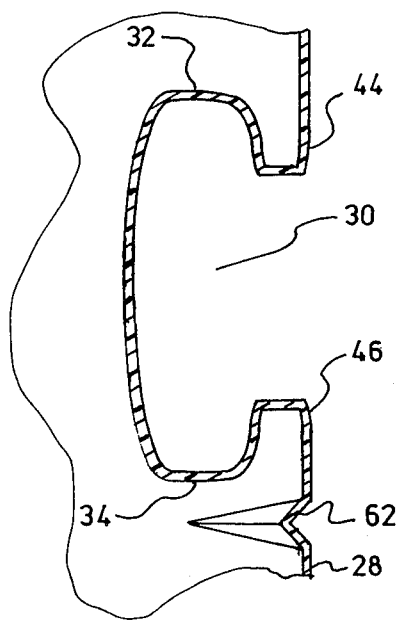
FIG. 6 is an enlarged detail view, in section, of a portion of FIG. 5 showing the recess and recess expanding means.
Figure 7:
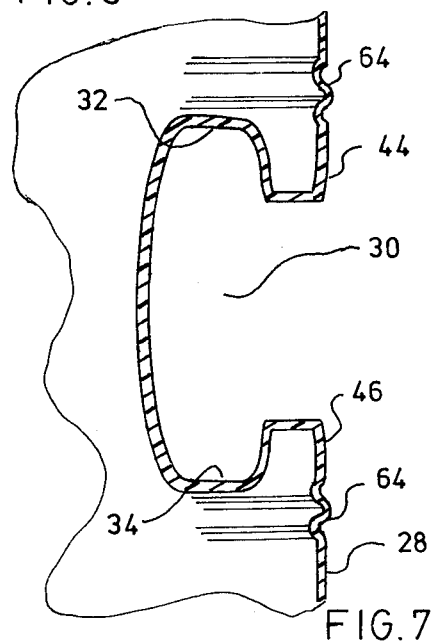
FIG. 7 is an enlarged detail view, in section, showing an alternative recess expanding means to that of FIG. 6.

FIGS. 5 to 7 show embodiments for plastic bottles which enable the recess 30 to accommodate to different size hands. In FIGS. 5 and 6, resilient means in the form of a pleat 62 are located adjacent the lower recess wall 34. When larger hands are used, the pleat 62 can collapse permitting a full, yet snug, compliment of fingers in the recess 30 for maximum grip security. As shown, the pleat 62 is triangular in cross section with its wider end adjacent to recess opening 40 and its apex adjacent to back wall 36.

Alternatively, FIG. 7 shows resilient means in the form of corrugations 64 which replace pleat 62 at or near the lower recess wall 34 to effect the recess expanding action. Additional corrugations 64 are located adjacent the upper recess wall 32 to increase the degree to which the recess 30 can be expanded. Other recess expanding means at or near upper recess wall 32 or at or near both upper recess wall 32 and lower wall 34 may also be used.

Figure 8:
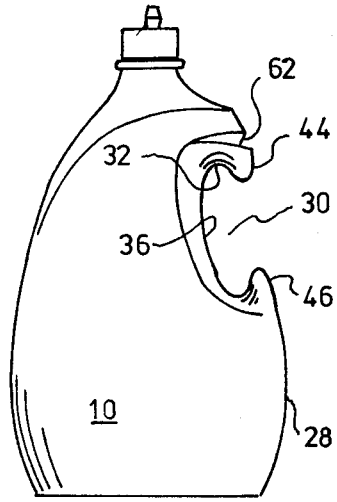
FIG. 8 is a front elevational view of a detergent bottle of the present invention.

In FIG. 8 there is shown a plastic detergent bottle 10 of generally oval cross section with a recess 30 and projections 44 and 46 used for gripping, lifting and pouring. A pleat 62 is located adjacent the upper recess wall 32 to facilitate a secure grip for large hands.

In FIG. 9 there is shown a glass wine bottle 10 of generally circular cross section, with projections 44 and 46 and recess 30 which are at an acute angle to the longitudinal axis of the bottle 10 to facilitate gripping, lifting and pouring. The upper projection 44 is on the neck portion of the bottle 10 and the recess 30 is located in the transitional area 22 between the neck 14 and the sidewall 28. This arrangement locates the primary lifting element, the projection 44, near the vertical centerline of gravity of the bottle 10 to reduce the tendency of the bottle 10 to tilt when lifted.

In FIG. 10 there is shown a bioriented plastic liquor bottle 10 of generally circular cross section with a recess 30 and projection 44 and 46 used for gripping, lifting and pouring.

In FIG. 11 there is shown a plastic jerry can of a generally rectangular cross section with projections 44 and 46 and recess 30 which are in the top wall and at a perpendicular angle to the longitudinal axis of the can 10. In this embodiment, projection 44 and projection 46 bear an equal amount of the load during lifting, in contrast to the load distribution in the other embodiments where the upper projection 44 always bears the major proportion of the load.

With respect to the bottles and handles of the present invention, they can be used to contain and pour a wide variety of pourable products. These include:

beverages, such as fruit juices and drinks, liquor, wine and milk;

foods, such as edible oils, pourable dressings, vinegar and syrups;

medicinal and health products, such as oral antiseptics;

toiletries and cosmetics, such as shampoo and hair care products;

household chemicals, such as general purpose and dishwashing detergents and bleaches; and auto and marine products, such as motor oil and antifreeze.

With respect to producing glass containers 10 of the invention they can be formed by any of the several techniques, including blow and press and blow techniques.

In the blow and blow technique a glob of molten glass is fed into a parison mold where the neck finish and parison is formed by blowing air pressure with the glob to force the molten glass against the neck finish to fully define such finish and form the preform. The parison is then transferred to a blow mold having the finished container shape including the recess and the integral projections of the handle and the preform is expanded to the walls of the mold by internally feeding gas under pressure therewithin.

In the press and blow technique an internal mandrel is used to form the neck finish and preform and thereafter the parison is transferred to the blow mold in which the final shape of the container is formed as has just been described.

With respect to producing the plastic containers 10 of the invention, they can be formed by any of several molding techniques, including extrusion blow-molding, injection blow molding and stretch blow-molding. In each instance the mold has the finished container shape including the recess and integral projections of the handle without incurring the disadvantages described at the outset of this application.

In the stretch blow-molding process biaxial orientation of the polymeric materials only can occur over a range of temperatures within which some part of the stress applied during blowing produces strain in the polymer. It has been indicated that this requirement is met in many polymer materials if blowing is carried out within a finite temperature range above $T_g$. For these purposes, $T_g$ is assigned its conventional meaning of the temperature representing the transition from the glass phase to the rubber phase produced upon heating of the polymer. An acceptable range for biorientation—i.e., for stretch blow molding in the usual case, does not exceed 100° F. above $T_g$ for amorphous polymers. Crystalline polymers, such as polypropylene are processed at temperatures slightly below their crystalline melting point, $T_c$. To a significant extent, the degree of biorientation and, in consequence, the improvement in physical properties attendant upon this parameter increases for a given degree of expansion as temperature is decreased. A significant improvement in properties is generally found to result in those procedures in which the average wall thickness is reduced by a factor of at least two, while the plastic is at a temperature within 100° F. or preferably 50° F. above $T_g$. This is considered to be preferred from the standpoint of stretch blow molding, per se, and in similar fashion is considered to define a preferred embodiment in accordance with the invention.

With respect to materials for forming the containers, these include those satisfactory for blow-molding or those satisfactory for the preferred embodiments of stretch blow molding. Both contemplate polymeric materials which at least during the blowing operation are thermoplastic. Compositionally, polymer (or plastic) material satisfactory for use are hydrocarbons or substituted hydrocarbons. Materials include the simple unsubstituted homopolymers, polypropylene and polystyrene, substituted polymers, such as, acrylnitriles, and polyesters, such as polyethylene terephthalate.

With respect to terms herein, they have been used in their conventional sense. For example, as described above, particularly useful embodiments depend upon extrusion or injection molding to produce a preform and stretch blow molding to produce the final bottle. These and other terms used in the description are briefly defined:

*Plastic:* a category or organic materials, generally thermoplastic, substituted or unsubstituted, hydrocarbons—examples are polyolefin, such as polypropylene, and polyesters, such as polyethylene terephthalate.

$T_c$: (glass transition) temperature at which the plastic changes from a glassy state to a rubbery state. Molding operations are invariably carried out substantially above $T_c$—generally at temperatures at least 100° F. in excess. Preferred embodiments herein which depend upon biaxial orientation are carried out with the plastic in the rubbery state but over a lower range, generally within 100° F. of $T_c$.

*Molding:* that category of procedures in which plastic material is caused to flow into the interstices of the mold to result in a formed object which becomes rigid upon cooling.

*Preform:* (occasionally referred to as a parison) the molded form which, in the procedure of the invention, is formed preliminary to expansion to produce the final object and, therefore, a form somewhat smaller than that of the final object. As generally contemplated, the preform is produced with the plastic at an elevated temperature in excess of 100° F. above $T_c$.

*Extrusion molding:* that molding procedure generally utilized to produce the preform or parison. In the usual commercial process, plastic materials introduced as particulate matter by a screw or ram with or without external heating is brought to elevated temperature so that it is introduced as a flowing plastic under pressure through a die to produce the preform.

*Injection molding:* that molding procedure generally utilized to produce the preform. In the usual commercial process, plastic materials introduced as particulate matter by a screw or ram with or without external heating is brought to elevated temperature so that it is introduced as a flowing plastic under pressure into a mold to produce the preform. Connecting passages known as runners are common.

*Compression or Transfer molding:* One of the more common alternatives to injection molding to produce the preform in which a mass of plastic is heated and is introduced into a mold portion. Whereafter, an additional mold portion, such as a plunger, distorts the mass to cause it to conform, again, with the interstices of the now completed mold.

*Blow molding:* This term contemplates expansion of the preform to its final configuration by the use of gas under pressure. This requires use of a blow mold. As practiced in the past, no effort was made to change the temperature of the preformed plastic before or during the blowing operation. Some reduction in temperature naturally results from contact with the preform mold or in transfer to the blow mold.

*Stretch blow molding:* Blow molding in which the preform is stretched often by means of an inserted plunger prior to blowing. The procedure is recognized as advantageously practiced with the plastic material within a temperature range close to but above $T_g$ so as to result in extension of the polymer molecules from their natural state to an extended state with the major molecular axis as resolved lying in the direction of stretch. Blowing is carried out within the same temperature range designed to result in retained orientation and produces orientation in the blow direction so that the resulting final configuration is "biaxially oriented".

The invention in its broader aspect is not limited to the specific described embodiments and departures may be made therefrom within the scope of the accompanying claims without departing from the principals of the invention and without sacrificing its chief advantages.

I claim:

1. A container having pouring means and a wall extending from said means, comprising a recess in the wall which forms a space for finger placement in the wall and within said recess, and an integral handle including opposing, integral, spaced apart means extending from the wall into and essentially within said recess adapted to be gripped for lifting, carrying and pouring from the container.

2. A container having pouring means and a wall extending from said means, comprising a recess in the wall which forms a space for finger placement in the wall and within said recess, and an integral handle including integral projections extending from the wall into and essentially within said recess, wherein said projections extend into said recess a distance sufficient to allow gripping thereof by the forefinger and another finger, respectively, and wherein the space between said projections is sufficient to accommodate any intermediate finger.

3. A bottle having a neck portion at one end, a base at its other end and a sidewall therebetween comprising:
   a recess in and open at said sidewall having a back wall, and upper and lower walls which form a space for finger placement through said opening, and
   an integral handle essentially within the breadth of the bottle having a projection extending from said upper wall into said recess only a distance sufficient for holding by the forefinger for gripping, lifting, carrying and pouring, and a projection extending from said lower wall into said recess only a distance sufficient for holding by the little finger for cooperating with said upper projection for pouring, and
   wherein the space between said projections is sufficient for the passage of the two middle fingers to allow them to serve as spacers to hold the forefinger against said upper wall and the little finger against said lower wall.

4. A container having a top wall and pouring means at one end portion of said wall, comprising:
   a recess in and open at said top wall having a bottom wall and two opposing side walls which form a space for finger placement through said opening, and
   an integral handle essentially within the breadth of the container having opposing projections extending from said side walls into said recess a distance sufficient for holding by at least two fingers for gripping, lifting, carrying and pouring.

5. The container of claims 1, 2, or 4, wherein said container comprises glass.

6. The container of claims 1, 2, or 4, wherein said container comprises a plastic material.

7. The container of claims 1, 2, or 4, wherein said container comprises a biaxially oriented thermoplastic material.

8. The container of claims 1, or 2, wherein said recess is in a sidewall and is concave in the vertical and horizontal planes.

9. The container of claims 1, 2, or 4, wherein the wall adjacent said recess is resilient to allow outward deflection thereof to facilitate finger placement therewithin.

10. The container of claims 1, 2, or 4, wherein the wall adjacent said recess includes flexible means to allow outward deflection thereof to facilitate finger placement therewithin.

11. The container of claims 1, 2, or 4, wherein said wall adjacent said recess includes a flexible pleat therein to allow outward deflection thereof to facilitate finger placement therewithin.

12. The container of claims 1, 2, or 4, wherein said wall adjacent said recess includes flexible bellows therein to allow outward deflection thereof to facilitate finger placement therewithin.

13. The bottle of claim 3, wherein said bottle comprises glass.

14. The bottle of claim 3, wherein said bottle comprises a plastic material.

15. The bottle of claim 3, wherein said bottle comprises a biaxially oriented thermoplastic material.

16. The bottle of claim 3, wherein said back, upper and lower portions have concave shapes.

17. The bottle of claim 3, wherein the wall adjacent said recess is resilient to allow outward deflection thereof to facilitate finger placement therewithin.

18. The bottle of claim 3, wherein the wall adjacent said recess includes flexible means to allow outward deflection thereof to facilitate finger placement therewithin.

19. The bottle of claim 3, wherein said wall adjacent said recess includes a flexible pleat therein to allow outward deflection thereof to facilitate finger placement therewithin.

20. The bottle of claim 3, wherein said wall adjacent said recess includes flexible bellows therein to allow outward deflection thereof to facilitate finger placement therewithin.

* * * * *